United States Patent [19]

Maurukas

[11] 3,876,375

[45] Apr. 8, 1975

[54] BIOLOGICAL COMPOSITION FOR USE AS A REFERENCE CONTROL IN DIAGNOSTIC ANALYSIS

[76] Inventor: Jonas Maurukas, 6823 Lake Ave., Elyria, Ohio 44035

[22] Filed: Aug. 20, 1973

[21] Appl. No.: 389,870

Related U.S. Application Data

[63] Continuation-in-part of Ser. No. 201,160, Nov. 22, 1971, abandoned.

[52] U.S. Cl. .............................. 23/230 B; 252/408
[51] Int. Cl. .......................................... G01n 33/16
[58] Field of Search .................. 23/230 B; 252/408; 424/101

[56] References Cited
UNITED STATES PATENTS
3,629,142  12/1971  Marbach ........................... 23/230 B
3,753,863  8/1973  Speck ................................. 23/230 B

*Primary Examiner*—R. E. Serwin

[57] ABSTRACT

Preparation of stable aqueous-containing biological compositions capable of use as liquid human reference serums in diagnostic analysis using sequential multi-channel automated analyzers having improved storage stability and capable of storage in the liquid state for extended periods of time at temperatures ranging from about −20°C. to ambient room temperatures, processes for preparing the reference serums and the process of automated analysis utilizing the improved reference serums. The subject materials are prepared by freezing the aqueous-containing labile biologicals rapidly at temperatures ranging from about −20° to about −30°C., removing from 20 to 40 weight per cent of the water therefrom, adding to the partially dewatered material alkylene polyol containing from 2 to 5 carbon atoms in a concentration substantially the same as the removed water, mixing the components and reducing the freezing temperature thereof to a temperature of about −20° to −25°C. followed by the storage in the liquid state preferably at from −20° to 0°C.

22 Claims, No Drawings

BIOLOGICAL COMPOSITION FOR USE AS A REFERENCE CONTROL IN DIAGNOSTIC ANALYSIS

This application is a continuation-in-part of parent application entitled "IMPROVED BIOLOGICAL COMPOSITION AND PROCESS" filed on November 22, 1971, Ser. No. 201,160, by Jonas Maurukas and now abandoned.

The present invention is directed to a process for preparing stable liquid human reference serums containing biological materials, including such biologically active substances as found in blood serum; plasma; enzymes; metabolites; hormones; electrolytes; etc., in a manner which will enable their storage in liquid form at temperatures ranging from about −20°C. up to ambient room temperatures, e.g., 25°C., and permit their direct use as reference standards in instrumental analysis without the necessity for addition of water to them. This invention is also directed to the stable reference serums thus prepared and the improved analytical procedures using them.

BACKGROUND, AND PREVIOUS ATTEMPTS TO PROVIDE REFERENCE STANDARDS FOR AUTOMATED ANALYSIS

Biologically active substances such as found in serums; enzymes; hormones; electrolytes and biologically active substrates or metabolites, are used widely in the diagnosis of diseases. They are used as reference standards for instrumental automated colorimetric analysis since they contain all or most of the components of the unknown to be analyzed. Once the diagnosing physician is aware of the patient's concentration of components, viz., differences versus normal mean ranges of concentration of such components, the diagnosis can be made more objectively. In their natural form, when separated from their normal biological environment, such biologically active substances are unstable and undergo undesirable changes under the influence of heat, enzyme action, hydrolysis and other influences causing undesirable molecular transformations therein. In the past, several methods of preservation have been utilized for such labile biological products.

One such procedure involved "freeze-drying" of the biological. The freeze-drying procedure essentially involves rapidly reducing the temperature of the aqueous-containing biological followed by dewatering it to a very substantial, if not total, extent at reduced pressures. Not only is this procedure expensive, but also it requires reconstituting (resupplying) the removed water prior to use of the stored biological. Natural proteins tend to denature upon losing substantial concentrations of water. Thus, natural proteins can undergo compositional changes and loss of biological activity due to substantial dewatering occurring in freeze-drying. This reduces their reliability when such biologicals are reconstituted with water and used as reference standards for automated instrumental analysis. Additionally, the freeze-dried biological product often presents a turbid condition after reconstituting it with water. This can cause analytical error because many of the automated analytical procedures basically involve colorimetry. During the reconstitution procedure, volume errors are sometimes introduced when, for example, the serum is reconstituted to its original liquid form by addition of the water to the freeze-dried concentrate.

Further disadvantages or limitations to the prior art freeze-drying procedures are as follows: the proteins once freeze-dried, are denatured somewhat due to the substantial or even total dehydration thereof; the more sensitive aqueous-containing biological materials are sometimes precipitated by freeze-drying causing turbid solutions when they are subsequently reconstituted back with added water. Additionally, and perhaps most importantly, the stability of the "freeze-dried" biological materials are not sufficiently satisfactory in that the components thereof have a tendency to disintegrate, e.g., sugar or glucose as a component has been observed to disintegrate upon storage subsequent to freeze-drying. This also applies to enzymes and bilirubin.

The widely accepted procedure, prior to the discovery of this invention, was to preserve labile biologicals containing water by rapidly freezing them and storing them in the frozen condition at low temperatures until they are used. While this procedure is satisfactory as it is currently practiced, it does require utilization of a thawing process to permit the frozen biological to be available in its liquid form prior to utilization. Moreover, freezing does, in some cases, produce insoluble turbidity when the biological is brought back to the liquid state, and especially when it is brought back to room temperatures. This can cause analytical error in automated analyses based on colorimetry.

Compared to these aforementioned procedures, the procedures and composition of the present invention possess very significant advantages especially in that the aqueous-containing labile biological is kept in its liquid and active state while being stored at temperatures ranging from about −10°C. to about −30°C., and more preferably at temperatures ranging from about −25°C. to about −20°C., and results in the production of substantially clear, biologically active liquid suitable for use as reference standards in automated analyses without the necessity of substantial dewatering and reconstituting them with water prior to use. The ability of storing such aqueous-containing biologically active materials in liquid form has the added advantage of convenience and tends to obviate any errors inherent to the necessity of reconstituting, e.g., freeze-dried biologicals. Moreover, significant changes in viscosity are avoided as are volume changes by use of the processes and compositions of this invention.

The present invention offers a process for preparing biological reference serum with as low as a 0.5 per cent change in the volume thereof within a temperature range of from about +25°C. to about −20°C. Thus the expansion/reduction of volume as a function of temperature is as low as about 0.5 per cent. Avoiding increases in viscosity is desirable when preparing reference standard fluids to enhance their passage through tubing in multichannel automated analytical equipment. Since loss of biological activity is diminished or substantially avoided, analytical reliability is enhanced as compared with freeze-dried reference standards. Furthermore, use of preservatives, the specific nature of which will be disclosed more specifically hereinbelow, enables certain biological materials to be stored at temperatures as high as ambient room temperatures for reasonably long periods of time.

COMPOSITIONS AND THEIR PREPARATION

From the compositional viewpoint, the present invention is directed to liquid analytical reference standard biological compositions stable at temperatures of about −20°C. and higher (up to and including normal ambient room temperatures, viz., temperatures of from about −20°C. to about 25°C.) and capable of extended storage in the liquid state at said temperatures, said compositions comprising in their non-biological components from about 60 per cent to about 80 weight per cent water, from about 40 to about 20 weight per cent of an alkylene polyol having from 2 to 5 carbon atoms, the remainder being chiefly at least one natural biological material selected from the group consisting of blood serum, enzymes, proteins, enzyme substrates, hormones and metabolites.

Suitable alkylene polyols which can be used are, ethylene glycol, propylene glycol, butylene glycol, pentanediol and glycerol. The alkylene polyol material preferably is comprised of ethylene glycol, propylene glycol and/or glycerol; but other alkylene polyols can be utilized individually or in admixture. Additionally, as noted hereinafter, small concentrations of additives can be used, e.g., from about 0.05 to about 0.1 per cent by weight of the total biological composition can be comprised of alkali metal azide. Where no analysis for chloride is required, an alkali metal halide can be used in concentrations of from about 1 to about 20 per cent by weight of the total biological composition provided the analysis is not adversely affected.

Usually these aqueous-containing biological compositions contain in their non-biological components from about 60 to about 80 weight per cent water, from about 20 to about 40 weight per cent of an alkylene polyol of the type indicated hereinabove with the remainder being comprised chiefly of the aforementioned biological material.

In some cases it is desirable to employ various combinations of alkylene polyols. Thus it is desirable to employ compatible mixtures of ethylene glycol and/or propylene glycol and glycerol. While glycerol is often superior to ethylene glycol in regard to keeping proteins in solution, it does yield somewhat undesirable increases in viscosity of certain labile biological fluids. Since viscous fluids are hard to pump and introduce into certain equipment, e.g., pipettes, tubes, etc., the utilization of ethylene glycol or propylene glycol results in low viscosity and at the same time the attainment of a good depression of the freezing point to permit storage at low temperatures in the liquid state. The use of ethylene glycol in concentrations in excess of 33 per cent by volume tends to precipitate protein present in such labile biologicals however.

The stable liquid reference serums (aqueous biologicals) of this invention are prepared from natural specimens of aqueous biologicals by:

A. freezing the aqueous-containing biological within a period of about 2 to about 10 hours;

B. removing from about 20 to about 40 weight per cent water therefrom, and more usually from about 25 to about 35 weight per cent water is removed;

C. adding one or a combination of the aforementioned alkylene polyols thereto in a concentration substantially the same as the concentration of water removed from the biological material;

D. mixing the components thereof for time periods ranging from about 5 minutes to about 1 hour, and more usually from about 20 minutes to about 40 minutes; and E. reducing the temperature of the aforementioned mix containing the alkylene polyol(s) to temperatures ranging from about 5°C. to about −25°C., usually temperatures of about −18°C. to about −20°C. More usually the temperature thereof is reduced to about −20°C., viz., that of the freezer compartment of a household refrigerator.

In accordance with a preferred embodiment of this invention the weight per cent water removed in step (B) ranges from about 30 to about 33 weight per cent.

Preferably either ethylene glycol, glycerol, propylene glycol or a combination thereof is employed as the alkylene polyol component.

Usually the removal of water is conducted while the biological material is frozen and the removal is conducted at reduced pressures ranging from about 20 to about 1 millimeters of mercury, and more preferably at reduced pressures of from about 5 to 10 millimeters of mercury. The removal of water can be conducted rapidly, viz., during time periods of from about 2 to about 10 hours; or alternatively it can be conducted slowly and gradually by raising the temperature of the frozen biological material to a temperature ranging from about −5°C. to about +1°C. over a time period ranging from about 10 to about 24 hours. When the latter water removal procedure is conducted, the temperature of the frozen biological is raised slowly and gradually to a temperature of about 0°C. over a time period ranging from about 10 to about 30 hours and more preferably from about 10 to about 24 hours.

This more gradual dewatering procedure is especially desirable when used in conjunction with the preservation of enzymes. It is also a far more economical procedure for removing water than the rapid water removal under reduced pressure. By separating the water out as a solid (ice), the labile biological compounds can be kept at a 0°C. temperature which saves significantly on refrigeration expenses during storage, and preserves biological activity on a more enhanced basis.

OPTIONAL ADDITIVES, E.G., PRESERVATIVES

Preservatives can be employed to assist in stabilizing the aqueous-containing biological reference compositions against bacterial variation or decomposition, viz., increases shelf-life at higher temperatures. Preservatives are preferably alkali metal azides, e.g., sodium azide and potassium azide. The alkali metal azide of choice is sodium azide due to its inertness and comparatively ready availability and low cost. Alkali metal halides, e.g., sodium chloride, potassium chloride, lithium chloride, rubidium chloride and cesium chloride can be used in place of the alkali metal azide or in conjunction therewith. Of the chlorides, sodium chloride is the one of choice for much the same reasons as stated hereinabove with respect to sodium azide.

Sodium azide enhances the effectiveness of the alkylene polyol for attaining stability of serum at room temperature. However, storage of liquid serum stabilized with the alkylene polyol, e.g., ethylene glycol, propylene glycol, glycerol etc., at reasonably low temperatures, e.g., ranging from about 0°C. to about −25°C., e.g., about −20°C., does not require the use of sodium azide. At such temperatures, the alkylene polyol is sufficient to keep the serum in active liquid form apparently by acting as an "anti-freeze" and the use of the azide is considered unnecessary at these temperatures. The use of alkali metal halides, such as sodium chloride, to depress freezing points of serum, such as blood serum, gives satisfactory results in respect of assisting the maintenance of the liquid state in serums at reasonably low temperatures of about −20°C. Usually the use of sodium chloride will only be indicated where it is necessary to depress serum or other protein freezing points permitting storage in the liquid state or where alkylene polyols are contra indicated. Stability at room temperature does not appear to be significantly impaired by the use of either sodium azide and/or sodium chloride or other equivalent alkali metal azides and/or alkali metal halides, with the exception that the inorganic phosphorus and alkaline phosphatase contents of some serums are somewhat adversely affected by extended storage at moderately cool to ambient temperatures, viz., from about 0° to about 25°C. in the presence of such stabilizers.

While the biological stability at room temperature is enhanced by addition of very small concentrations of sodium azide, e.g., ranging from about 0.05 to about 0.1 weight per cent thereof based on total biological composition present; the use of such alkali metal azides has been observed to alter the composition of bilirubin in blood serums. For this reason the use of the alkali metal azides should be limited to cases where no bilirubin is involved in the labile biological or the alteration of bilirubin is insignificant.

Use of concentrations of sodium azide greatly exceeding those indicated above should be avoided since at higher concentrations (0.5–20% V/W) such azide inhibits enzymes and interferes with a number of normal metabolic chemical reactions. In very small concentrations, viz., 0.05–0.1% V/W, it inhibits the growth of molds and improves the stabilizing effect of alkylene polyols.

AUTOMATED ANALYSIS AND USE OF THE STABLE REFERENCE COMPOSITIONS AS ANALYTICAL STANDARDS IN COLORIMETRY

The present demands of clinical investigation on analytical laboratory services reached the point requiring automated clinical chemistry in place of prior manual methods, with their inherent and cumulative analytic errors. Automated procedures have been devised in which the sources of variability have been closely controlled by such means as the substitution of dialysis for protein precipitation, the combination of test fluid and reagents in flowing streams, closely controlled heating and reaction times, and flow-through, double-beam colorimeters coupled with recorders. Exemplary of such automated analytical devices are the commercially available *Technicon AutoAnalyzers* available from the Technicon Instruments Corporation, Chauncey, New York.

The sequence of operations for automated analysis is similar to that in a manual method and involves measurement of sample, removal of protein, addition of reagents, heating and reaction timing, measurement of color, and calculation of results. The automated system uses a pumping method in which plastic tubing of various internal diameters is alternately compressed and released by a set of rollers which imitate peristaltic action. Since the rollers travel over the tubing at a constant rate, the actual volume of fluid transported depends on the bore of the tubing. Separation of one sample from the next is achieved by insertion of air bubbles into the stream; this also gives some "scrubbing" action which minimizes contamination of one sample by the next. The segmentation of the fluid streams in this manner also permits mixing by passing the stream through a rigid glass helix, mounted horizontally, in which each small portion of fluid is repeatedly tumbled as it passes along the coil.

Separation of protein from the samples is achieved by dialysis. The dialyzer consists of two plates; in one surface of each plate is cut a very accurately machined spiral groove, forming a continuous channel with a semi-circular cross-section. When the two plates are secured with their grooved surfaces facing each other and a very thin cellophane membrane separating them, a continuous channel of circular cross-section, divided along its whole length by the membrane, is formed. The total length of the channel is about 87 inches. If serum is flowing in one half of the channel and a reagent or other aqueous fluid in the other half, dialyzable constituents of the serum will pass across the membrane and enter the stream of reagent. Such substances as urea, glucose, creatinine, uric acid, phosphate, calcium, sodium, potassium, and chloride can by this means be removed from serum and the large nondialyzable protein molecules passed away to waste. It should be pointed out that only a proportion of the small molecules and ions is transferred from the sample stream to the reagent stream; but since, within limits, the same proportion of the contituents of a standard solution will also be transferred, the ratio of sample concentration to standard concentration will be maintained. The automated instrument operates on the accurate measurement of this ratio; reactions do not have to be taken to completion, as in the manual procedures, and thus reaction times can be shortened without loss of accuracy.

If the procedure requires a heating or incubation step, this is achieved by passing the mixture of reagent and sample dialysate along a rigid glass helix immersed in a suitable heating bath. The heating or incubation phase is exactly determined by the time taken by the fluids to traverse the coil when they are pumped at a constant rate. The baths are completely enclosed and stirred continuously, permitting accurate temperature control.

The colored solutions resulting from the reaction between the sample dialysate or standard dialysate and the reagents are passed into the flow-type cell of a twin-beam colorimeter which uses narrow band pass filters (about 17 millimicrons). The air bubbles are removed by suitable venting, and the absorbance of the colored solution is converted to an electrical signal by a photocell. A second photocell, previously set to 100 per cent transmittance with a potentiometer, serves as a reference. The difference in light absorbance between the two beams is amplified and fed to the recorder, which shows it as a peak on the tracing. Comparison of the height of the peak produced by the sample with that produced by a standard permits calculation of sample concentration.

The increase in demand for accurate chemical analysis of many components of natural body biological fluids led to the development of multichannel automatic analyzers. These machines were also required to be capable of sequential operation in order to handle the large volume of analytical samples to be analyzed. Since each separate analysis (channel) had to be performed colorimetrically in comparison with a standard of known concentration (by independent analysis); the desirability of using a reference liquid containing each of the components sought to be analyzed became apparent. For example, it is present practice to analyze human blood for eighteen components, whose concentrations are reported in units as follows: total protein "T. Protein" (gram per cent); albumin (gram per cent); calcium "Ca" (milligram per cent); phosphorus "P" (milligram per cent); cholesterol (milligram per cent); uric acid (milligram per cent); creatinine (milligram per cent); total Bilirubin "T. Bili." (milligram per cent); alkaline phosphatase (microunits per milliliter); lactic dehygronenase "LDH" (microunits milliliter); glutamic-oxaloacetic transaminase "GOT" (microunits per milliliter); creatinine phosphokinase "CPK" (microunits per liter); chloride "Cl" (milliequivalents per liter); carbon dioxide "$CO_2$" (milliequivalents per liter); potassium "K" (milliequivalents per liter); sodium "Na" (milliequivalents per liter); blood urea nitrogen "BUN" (milligram per cent); and glucose (milligram per cent).

The liquid reference biological standards (serums) of this invention are used in commercially available differential multichannel analyzers based on colorimetry or spectrophotometry by placing said liquid serum (of known concentration for each component by separate independent analysis) into one of the sample vials in the machine permitting it to run through the machine and then hand setting the printer or recorder to the known concentration of each component as revealed by independent analysis. Hence, each standardized component has its own intensity of color or optical density and can serve as a reference standard for each analysis (channel). Once the opacity or shade or intensity of color has been equated with a mathematical unit value of concentration for each component, then analysis of the various unknowns can proceed automatically to yield multichannel analytical print-out results on a large number of unknowns sequentially. The use of the reference serum compositions of this invention constitutes an improvement because it permits use of a stable reference standard having a composition which is very close to that found in the human body.

EXAMPLE I

This example describes the procedure employed to form stabilized human blood serum reference composition.

Human blood serum obtained from a clinical laboratory was collected in bacteria-free polyethylene bottles and quickly frozen to the solid state over a period of 24 hours at freezing temperatures of −20°C. One gallon of the thus frozen serum was then processed as follows: approximately 33 weight per cent of the water was removed from the frozen serum at a reduced pressure of 5 to 10 millimeters of mercury in a vacuum bell jar device insulated to maintain a temperature not exceeding about 30°C. to 35°C. This yielded approximatley 2666 milliliters of concentrated serum liquid. To this serum liquid was added approximately 1333 milliliters of analytical reagent grade ethylene glycol. The thus obtained mixture was then stirred for 30 minutes resulting in a transparent, clear straw-colored homogeneous liquid.

The processed serum was then stored in the freezer compartment of a refrigerator at a temperature of approximately −20°C. and not in excess thereof. At this temperature the serum stayed in its intended liquid form for a period of eight months with no noticeable change in clarity, stability, or appearance. Subsequent examinations of the serum revealed its usefulness as determined by the following criteria:

STABILIZED SERUM EXAMINATION

Turbidity of the serum was inspected spectrophotometrically before and after stabilizing and at intervals of 1 month during the aforementioned storage period (−20°C.).

CHEMICAL COMPOSITION CHANGES

Routine non-automated clinical chemistry procedures were used in chemical examination of stabilized serum at the time of preparation and then daily for approximately 2 weeks and monthly for 7 months. At least 20 chemical (enzymatic, hormonal, metabolic) components of the serum were determined in this fashion periodically.

An automated analyzer ("Autotechnicon" SM-12) was also applied to the chemical analysis of the serum, by at least 3 independent laboratories and results were used for comparison of stability and reproducibility.

Stability of chemical components was also determined after subjecting the serum to prolonged elevated temperatures (37°–45°C.). These test revealed the serum to be stable eight months after preparation in accordance with this invention.

Compositions prepared as described in this example were tested for stability on refrigerator storage based on the established permissible limits of deviation as shown below in Table I.

TABLE I

| PERMISSIBLE LIMITS OF DEVIATION | | | | | | |
|---|---|---|---|---|---|---|
| Component | Normal Range | | 1 | 1 | 8%* | .5$S_R$** |
| T. Protein | 6.0–8.0 | g% | .2 | .3 | .16 | 0.22 |
| Albumin | 3.5–5.0 | g% | .2 | .2 | .12 | 0.15 |
| Ca | 8.5–10.5 | mg% | .3 | .4 | .16 | 0.04 |
| P | 2.5–4.5 | mg% | .2 | .3 | .16 | 0.23 |
| Cholesterol | 150–300 | mg% | 10.0 | 18.0 | 12.00 | 17.00 |
| Uric Acid | 2.5–8.0 | mg% | .3 | .6 | .44 | 0.57 |
| Creatinine | 0–1.4 | mg% | .1 | .2 | .11 | — |
| T. Bili. | 0.2–1.0 | mg% | — | .2 | .06 | — |
| Alk. Phos. | 30–85 | mU/ml | 5.0 | 8.0 | 4.40 | — |
| CPK | 25–145 | mU/ml | — | 8.0 | 9.60 | — |
| LDH | 100–225 | mU/ml | 16.0 | 16.0 | 10.00 | — |
| GOT | 7–40 | mU/ml | 2.0 | 2.0 | 2.60 | — |
| Cl | 95–105 | meq/l | 3.0 | 4.0 | 0.80 | 0.9 |
| $CO_2$ | 24–32 | meq/l | 2.0 | 2.0 | 0.64 | 0.8 |
| K | 3.5–5.0 | meq/l | .2 | .2 | 0.12 | 0.14 |
| Na | 135–145 | meq/l | 3.0 | 4.0 | 0.80 | 0.5 |
| BUN | 10–20 | mg% | 1.0 | 1.0 | 0.80 | 1.5 |
| Glucose | 65–110 | mg% | 6.0 | 11.0 | 3.60 | 4.5 |

*Ad Hoc Advisory Committee NIH (National Institute of Health) Guidelines for Preparation of Control Materials: Class A reference material guide line "95% confidence interval does not exceed 8% of the 95% normal range"
**Cotlove, Harris & Williams, Clin. Chem. 16 1028 (1970) .5$S_R$ "tolerable analytic variability"
1 acceptable deviations listed for two commercial lyophilized products If results obtained on repeated analyses of the pooled, liquid reference serum over prolonged periods of time are near or within these limits, it can be concluded that the components were stable. Several lots of sera were prepared and analyzed after given periods of refrigerator storage. These lots of sera were analyzed two or three times per week (several analyses each time) for from 35 weeks to 66 weeks. Tables 2, 3 and 4 present the analytical date for each of three serum lots M-1, M-2 and M-10 after varying periods of storage. The total deviation observed is the sum of the laboratory's analytical variation plus the variation due to changes in the serum as a consequence of storage.

If storage causes deterioration or loss of a component it might be postulated that a progressive decline in its level would be noted. Conversely, a progressive increase in the level of a coomponent might be the consequence of a mircobiological or enzymatic activity. The lack of either a progressive decline or progressive increase might be considered an indication of the stability of the preparation. Examination of Tables 2, 3 and 4 reveals that not once in the 54 possibilities (3 × 18 components) was there evidence of a progressive decline or increase in the level of a component, including four of the enzymes (alkaline phosphatase, creatine phosphokinase, lactic dehydrogenase and transaminase).

TABLE 2

STABILITY OF M-1 SERUM

| WEEK No. | | 6 | 17 | 34 | 40 | 50 | 66 |
|---|---|---|---|---|---|---|---|
| T. Protein | g% | 7.8 | 6.8 | 7.4 | 7.7 | 7.5 | 7.6 |
| Albumin | g% | 4.6 | 4.1 | 4.2 | 4.1 | 4.0 | 3.6 |
| Ca | mg% | 6.2 | 6.5 | 6.7 | 7.2 | 6.9 | 6.3 |
| P | mg% | 4.6 | 3.8 | 5.9 | 6.0 | 6.3 | 6.4 |
| Cholesterol | mg% | 201 | 195 | 186 | 202 | 198 | 200 |
| Uric Acid | mg% | 5.1 | 4.5 | 4.5 | 4.6 | 4.8 | 4.3 |
| Creatinine | mg% | 1.9 | 1.3 | 1.2 | 1.1 | — | 1.5 |
| T. Bili. | mg% | 0.2 | 0.2 | 0.1 | 0.2 | 0.1 | 0.1 |
| Alk. Phos. | mU/ml | 49 | 19 | 44 | 57 | — | 71 |
| CPK | mU/ml | 109 | 162 | 160 | 127 | 160 | 185 |
| LDH | mU/ml | 113 | 110 | 121 | 126 | 112 | 142 |
| GOT | mU/ml | 12 | 21 | 23 | 22 | 20 | 21 |
| Cl | meq/l | 101 | 94 | 113 | 116 | 118 | 119 |
| CO$_2$ | meq/l | 26 | 24 | 28 | 29 | 27 | 25 |
| K | meq/l | 4.9 | 4.8 | 5.0 | 5.1 | 5.1 | 5.4 |
| Na | meq/l | — | — | — | — | — | — |
| BUN | mg% | 18 | 19 | 16 | 17 | 17 | 15 |
| Glucose | mg% | 98 | 104 | 98 | 100 | 100 | 121 |

TABLE 3

STABILITY OF M-2 SERUM

| WEEK NO. | | 1 | 6 | 17 | 34 | 55 | 60 |
|---|---|---|---|---|---|---|---|
| T. Protein | g% | 7.0 | 7.3 | 6.9 | 7.6 | 7.0 | 7.8 |
| Albumin | g% | 4.2 | 4.4 | 4.2 | 4.4 | 4.2 | 4.6 |
| Ca | mg% | 9.9 | 10.7 | 9.2 | 10.2 | 9.9 | 9.7 |
| P | mg% | 3.6 | 3.8 | 3.5 | 3.8 | 3.6 | 4.1 |
| Cholesterol | mg% | 214 | 247 | 220 | 191 | 214 | 210 |
| Uric Acid | mg% | 5.3 | 5.3 | 4.5 | 4.1 | 5.3 | 5.3 |
| Creatinine | mg% | 1.0 | 1.3 | 1.2 | 0.9 | 1.0 | 1.5 |
| T. Bili. | mg% | 3.6 | 2.1 | 2.5 | 1.2 | 3.6 | 1.3 |
| Alk. Phos. | mU/ml | 53 | 64 | 46 | 73 | 53 | 77 |
| CPK | mU/ml | 462 | 495 | 430 | 410 | 462 | |
| LDH | mU/ml | 166 | 153 | 135 | 138 | 166 | 149 |
| GOT | mU/ml | 38 | 36 | 32 | 29 | 38 | 27 |
| Cl | meq/l | 102 | 103 | 93 | 103 | 102 | 103 |
| CO$_2$ | meq/l | 24 | 21 | 23 | 21 | 24 | 21 |
| K | meq/l | 4.6 | 4.5 | 4.8 | 4.7 | 4.6 | 4.5 |
| Na | meq/l | 147 | 150 | 153 | 148 | 147 | 150 |
| BUN | mg% | 18 | 19 | 18 | 17 | 18 | 19 |
| Glucose | mg% | 102 | 100 | 102 | 101 | 102 | 100 |

TABLE 4

STABILITY OF M-10 SERUM

| WEEK NO. | | 1 | 2 | 15 | 23 | 30 | 34 |
|---|---|---|---|---|---|---|---|
| T. Protein | 8% | 7.1 | 7.0 | 7.1 | 7.3 | 7.3 | 7.0 |
| Albumin | 8% | 4.0 | 4.1 | 4.1 | 4.1 | 4.4 | 4.3 |
| Ca | mg% | 8.5 | 8.2 | 7.5 | 8.0 | 8.3 | 7.8 |
| P | mg% | 3.2 | 3.1 | 3.0 | 3.6 | 3.3 | 3.6 |
| Cholesterol | mg% | 212 | 210 | 193 | 207 | 213 | 204 |
| Uric Acid | mg% | 5.1 | 5.0 | 5.0 | 4.8 | 5.9 | 5.0 |
| Creatinine | mg% | 2.2 | 2.2 | 2.2 | 2.4 | 2.3 | 2.3 |
| T. Bili. | mg% | 2.2 | 2.7 | 2.2 | 2.2 | 2.2 | 2.1 |
| Alk. Phos. | mU/ml | 75 | 78 | 103 | 107 | 102 | 106 |
| CPK | mU/ml | 148 | 195 | 190 | 169 | 228 | 223 |
| LDH | mU/ml | 133 | 123 | 106 | 109 | 107 | 99 |
| GOT | mU/ml | 55 | 33 | 25 | 25 | 24 | 32 |
| Cl | meq/l | 105 | 104 | 103 | 105 | 105 | 105 |
| CO$_2$ | meq/l | 23 | 23 | 22 | 22 | 23 | 22 |
| K | meq/l | 4.6 | 4.6 | 4.6 | 4.6 | 4.6 | 4.6 |
| Na | meq/l | 149 | 148 | 148 | 149 | 149 | 149 |
| BUN | mg% | 18 | 17 | 19 | 18 | 18 | 18 |
| Glucose | mg% | 116 | 118 | 116 | 116 | 120 | 116 |

Upon demonstration that the reference serum could be stored satisfactorily, samples thereof were distributed to several independent laboratories for repeated analyses by a variety of procedures using manual and automated analytical devices including those of the *Technicon* AutoAnalyzer system, viz., SM-12/30 and SM12-60 and another automated analytical device, viz., the Mark X analyzer, also commercially available.

Table 5 below compares results obtained in one laboratory by the *Technicon SMA* automated procedures with results in other laboratories by manual techniques, by Mark X automation and by SMA 12/30. Each value represents the average of several analyses.

Another advantage of the stabilized pooled liquid human reference serums of the present invention is their use in the routine calibration of automatic clinical analysis equipment to be used for analyzing human unknown serums.

Stabilized pooled liquid human reference serum lot "M-10" as prepared hereinabove was used to calibrate autoanalyzers in sixty-three (63) analyses for eleven (11) components on specimens from the Center for Disease Control, also known as Communicable Disease Center, "CDC", in a six-month proficiency testing program. Table 6 below sets forth a comparison of analyses by the CDC laboratory and another laboratory identified in the table as "CLO" which used lot M-10 of this invention for calibration of the automated analyses performed by Technicon AutoAnalyzers. The CDC results are the mean referee values. Except for one chloride analysis and a slight analytical bias on calcium and total protein, the correlations are good, which is indicative of high proficiency.

TABLE 5

INTRA-LABORATORY AND METHODOLOGY COMPARISONS

|  | Lot M-1 | | Lot M-10 | | Lot M-2 | |
| --- | --- | --- | --- | --- | --- | --- |
|  | Manual | SMA 12/60 | SMA 12/30 | SMA 12/60 | Mark X | SMA 12/60 |
| T. Protein | 7.8 | 7.5 | 7.1 | 7.2 | 6.9 | 7.4 |
| Albumin | 3.9 | 4.5 | 4.2 | 4.3 | 4.2** | 4.4 |
| Ca | 6.7 | 6.6 | 8.9 | 8.2 | | |
| P | 3.4 | 4.2 | 3.4 | 3.2 | 4.0 | 4.0 |
| Cholesterol | 175 | 211 | 204 | 204 | | |
| Uric Acid | 5.1 | 4.9 | 5.3 | 5.1 | 3.3 | 5.2 |
| T. bilirubin | 0.3 | 0.2 | 1.7 | 2.7 | | |
| Alk. Phosp. | 47 | 47 | 16* | 86 | 24* | 67 |
| LDH | 135 | 122 | 88* | 127 | 62* | 161 |
| GOT | 35 | 19 | 35* | 24 | 82* | 32 |
| BUN | 21 | 18 | 20 | 18 | 15 | 18 |
| Glucose | 97 | 97 | 119 | 116 | 109 | 100 |
| Cl | 101 | 104 | | | | |
| K | 5.0 | 5.0 | | | | |

*comparisons improper because units differ
**by subtraction of globulin from total protein

TABLE 6

| | | | | | | | |
| --- | --- | --- | --- | --- | --- | --- | --- |
| GLUCOSE | CLO | 74 | 98 | 100 | 123 | 147 | |
| | CDC | 75 | 98 | 98 | 126 | 148 | |
| CHOLESTEROL | CLO | 146 | 177 | 192 | 252 | 305 | 350 |
| | CDC | 155 | 182 | 183 | 261 | 305 | 357 |
| BUN | CLO | 17 | 17 | 17 | 25 | 53 | 82 |
| | CDC | 16 | 16 | 16 | 26 | 54 | 81 |
| URIC ACID | CLO | 2.7 | 2.8 | 4.4 | 5.3 | 8.2 | 9.3 |
| | CDC | 3.0 | 2.8 | 4.6 | 5.6 | 8.3 | 9.6 |
| CREATININE | CLO | 1.5 | 1.5 | 1.5 | 2.0 | 2.1 | 2.3 |
| | CDC | 1.5 | 1.5 | 1.5 | 1.7 | 2.0 | 2.0 |
| BILIRUBIN | CLO | 4.0 | 4.1 | 4.2 | 4.4 | | |
| | CDC | 3.8 | 3.8 | 4.1 | 4.2 | | |
| TOTAL PROTEIN | CLO | 3.6 | 6.1 | 6.4 | 7.4 | 7.5 | 8.4 |
| | CDC | 3.3 | 5.7 | 6.1 | 7.2 | 7.2 | 8.0 |
| CALCIUM | CLO | 4.1 | 7.3 | 8.2 | 9.7 | 9.7 | 10.7 |
| | CDC | 4.5 | 7.7 | 8.4 | 10.0 | 10.0 | 11.0 |
| SODIUM | CLO | 122 | 124 | 126 | 134 | 139 | 146 |
| | CDC | 123 | 126 | 128 | 136 | 140 | 148 |
| POTASSIUM | CLO | 2.9 | 3.3 | 4.5 | 4.9 | 5.0 | 7.1 |
| | CDC | 2.9 | 3.3 | 4.5 | 5.0 | 5.0 | 7.1 |
| CHLORIDE | CLO | 88 | 104 | 106 | 110 | 118 | 120 |
| | CDC | 88 | 103 | 98 | 104 | 114 | 119 |

EXAMPLE II

The procedure as in Example I was repeated with the exception that subsequent to the addition of ethylene glycol and stirring, two grams of sodium azide preservative was added to the mixture and the mixture was stirred for 30 minutes at room temperature. The processed serum was then stored in the freezer of a refrigerator at approximately −20°C. (and not in excess thereof) as in Example I. After storage for 8 months, the reference serum was analyzed and examined visually. Its appearance had not changed substantially and chemical analysis thereof, as in Example I, revealed no substantial change in the concentration of its components, thus indicating its stability.

EXAMPLE III

The procedure of Example I was repeated with the exception that instead of ethylene glycol an identical amount of analytical reagent grade glycerol was employed. This material, upon storage in a freezer compartment of a refrigerator at a temperature not exceeding −20°C., and more specifically at a temperature ranging from −10°C. to −20°C., stayed in its intended liquid form and underwent no substantial or noticeable change in appearance or composition when subjected to the inspection and chemical analytical procedures indicated hereinabove with respect to Example I after 8 months storage, thus indicating its stability.

EXAMPLE IV

The procedure of Example I was duplicated with the exception that instead of utilizing ethylene glycol, an identical amount of glycerol was employed and sodium azide (2 grams thereof) in solid form was added as in Example II and the mixture stored in the manner indicated in Example I. After storing for 8 months at a temperature not exceeding −20°C., and more specifically ranging from −10°C. to −20°C., the serum not only stayed in its intended liquid form, but underwent no noticeable changes in appearance or composition when subjected to the inspection and chemical analytical procedures indicated hereinabove with respect to Example I, thus indicating its stability.

EXAMPLE V

The procedure of Example I was duplicated using ethylene glycol; but instead of dewatering the frozen serum rapidly, it was dewatered gradually and very slowly over a period of approximately 24 hours whereupon it was permitted to reach a temperature of 0°C. from a previous freezing temperature of −20°C. The melting procedure was conducted by placing the previously frozen serum in a temperature state of 4°C. and the melting process produced slow but continuous delivery of a stream of concentrated serum. The concentrated serum was collected into a bacteria-free polyethylene bottle. This procedure yielded approximately 2666 milliliters of concentrated serum, leaving behind in the form of a frozen ice-cube approximately 1333 milliliters of ice together with some insoluble solid residual matter enmeshed into the matrix of the ice-cube. Addition of 1333 milliliters analytical grade ethylene glycol restored this serum to its original volume. When stored in liquid form at −20°C. for a period of eight (8) months there was no noticeable change in the appearance or composition of the serum when subjected to the inspection and chemical analysis procedures indicated hereinabove with respect to Example I, thus indicating the stability of reference serum prepared by the more gradual procedure.

A stable, liquid, pooled human reference serum has been described which is suitable for use as a calibration standard or reference control for clinical chemical analyses by sequential multiple channel automated analyzers capable of continuous flow, viz., analyzing a plurality of human unknown blood samples simultaneously.

There has likewise been described a process for preparing stable reference serum from human serum and an improved procedure for automated chemical analysis utilizes said serums.

While the invention has been described above chiefly in relation to human blood serum, its applicability to other human biologically active substances, such as found in serums, enzymes, hormones, electrolytes, and biologically active substrates and metabolates used widely in the diagnosis of diseases and non-human, naturally occurring biological liquids for use as analytical reference controls or standards will be appreciated by those skilled in the art.

What is claimed is:

1. A stable, liquid biological reference control composition for use in analysis of biologically similar unknowns, said composition being stable at −20°C. and capable of extended storage in the liquid state at said temperature and comprising in its non-biological component from about 60 to about 80 weight per cent water, from about 20 to about 40 weight per cent of at least one alkylene polyol having from 2 to 5 carbon atoms, the remainder being chiefly at least one natural biological material selected from the group consisting of blood serum, enzyme, metabolites, electrolytes and hormones.

2. A composition as in claim 1 wherein said biological material is human blood serum.

3. A composition as in claim 1 wherein said alkylene polyol is ethylene glycol.

4. A composition as in claim 1 wherein said alkylene polyol is propylene glycol.

5. A composition as in claim 1 wherein said alkylene polyol is butylene glycol.

6. A composition as in claim 1 wherein said alkylene polyol is pentanediol.

7. A composition as in claim 1 wherein said alkylene polyol is glycerol.

8. A process for preparing stable, liquid, biological reference control compositions for use in analysis of naturally occurring biologically similar unknowns, said compositions being stable at −20°C. and capable of extended storage in the liquid stage at said temperature comprising A. obtaining a portion of biological materials similar in composition to and containing the same component materials as the unknown to be analyzed, B. freezing said biological material over a period of about 10 to about 24 hours, C. removing from about 20 to about 40 per cent water therefrom, D. adding at least one alkylene polyol containing from about 2 to about 5 carbon atoms thereto in a concentration substantially the same as the removed water, E. mixing the components thereof, and F. reducing the freezing temperature thereof to from about 0°C. to about −20°C.

9. A process as in claim 8 wherein the temperature thereof is reduced in step (F) to a temperature of about −20°C.

10. A process as in claim 8 wherein from about 25 to about 35 weight per cent water is removed in step (C).

11. A process as in claim 8 wherein said alkylene polyol is ethylene glycol.

12. A process as in claim 8 wherein said alkylene polyol is propylene glycol.

13. A process as in claim 8 wherein said alkylene polyol is glycerol.

14. A process as in claim 8 wherein said alkylene polyol is butylene glycol.

15. A process as in claim 8 wherein said alkylene polyol is pentane diol.

16. A process as in claim 8 wherein said biologically similar material is human blood serum.

17. A process as in claim 8 wherein the removal of water is conducted while said biologically similar material is frozen at reduced pressures ranging from about 1 to about 10 millimeters of mercury.

18. A process as in claim 17 wherein said reduced pressure ranges from about 5 to about 10 millimeters of mercury.

19. A process as in claim 8 wherein removal of water is conducted by slowly and gradually raising the temperature of said frozen biologically similar material from a temperature of about −20° to about 0°C. over a period ranging from about 10 to about 30 hours.

20. A process as in claim 19 wherein said temperature is aobut 0°C. and said time period ranges from about 10 to about 24 hours.

21. In a process for performing automated continuous flow multichannel analyses on unknown biologically active naturally occurring materials, the improvement which comprises employing the stable liquid composition of claim 1 as a reference control in standardizing the automated analyzer and thereafter conducting continuous flow multichannel analyses utilizing said reference control composition wherein said reference control composition contains the same component materials as said unknowns.

22. In a process for performing automated continuous flow multichannel analysis on unknown biologically active human blood serum, the improvement which comprises employing the stable liquid composition of claim 2 as a reference control in standardizing the automated analyzer and thereafter conducting continuous flow multichannel analyses on human blood serum unknowns containing the same component materials as said reference control composition.

* * * * *

REEXAMINATION CERTIFICATE (1830th)

United States Patent [19]

Maurukas

[11] B1 3,876,375

[45] Certificate Issued Nov. 3, 1992

[54] BIOLOGICAL COMPOSITION FOR USE AS A REFERENCE CONTROL IN DIAGNOSTIC ANALYSIS

[76] Inventor: Jonas Maurukas, 6823 Lake Ave., Elyria, Ohio 44035

Reexamination Request:
No. 90/001,633, Nov. 7, 1988

Reexamination Certificate for:
Patent No.: 3,876,375
Issued: Apr. 8, 1975
Appl. No.: 389,870
Filed: Aug. 20, 1973

[51] Int. Cl.⁵ .................................. G01N 33/48
[52] U.S. Cl. .......................... 436/16; 435/26; 435/188; 436/12; 436/13; 436/14; 436/15; 436/18; 436/19
[58] Field of Search .................... 62/62; 436/8–18, 436/63, 71, 826; 435/1, 2, 4; 252/408.1

[56] References Cited

U.S. PATENT DOCUMENTS

| | | | |
|---|---|---|---|
| 3,080,725 | 3/1963 | Cowley et al. | 62/62 |
| 3,092,974 | 6/1963 | Haumann et al. | 62/62 |
| 3,185,623 | 5/1965 | Smith et al. | 435/2 |
| 3,228,838 | 1/1966 | Rinfret et al. | 435/2 |
| 3,260,648 | 7/1966 | Fox | 436/18 |
| 3,303,662 | 2/1967 | Moline et al. | 62/62 |
| 3,344,617 | 10/1967 | Rinfret et al. | 435/2 |
| 3,347,745 | 10/1967 | Rinfret et al. | 435/2 |
| 3,444,039 | 5/1969 | Rajamannan | 435/2 |
| 3,466,249 | 9/1969 | Anderson | 436/18 |
| 3,519,572 | 7/1970 | Kita | 436/18 |

*Primary Examiner*—Robert J. Hill, Jr.

[57] ABSTRACT

Preparation of stable aqueous-containing biological compositions capable of use as liquid human reference serums in diagnostic analysis using sequential multi-channel automated analyzers having improved storage stability and capable of storage in the liquid state for extended periods of time at temperatures ranging from about $-20°$ C. to ambient room temperatures, processes for preparing the reference serums and the process of automated analysis utilizing the improved reference serums. The subject materials are prepared by freezing the aqueous-containing labile biologicals rapidly at temperatures ranging from about $-20°$ to about $-30°$ C., removing from 20 to 40 weight per cent of the water therefrom, adding to the partially dewatered material alkylene polyol containing from 2 to 5 carbon atoms in a concentration substantially the same as the removed water, mixing the components and reducing the freezing temperature thereof to a temperature of about $-20°$ to $-25°$ C. followed by the storage in the liquid state preferably at from $-20°$ to $0°$ C.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 8–22 is confirmed.

Claims 1–7 are cancelled.

* * * * *